United States Patent
Dewa et al.

(10) Patent No.: US 7,250,705 B2
(45) Date of Patent: Jul. 31, 2007

(54) RESONANT OSCILLATING DEVICE ACTUATOR STRUCTURE

(75) Inventors: Andrew Steven Dewa, Plano, TX (US); John W. Orcutt, Richardson, TX (US); Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/228,893

(22) Filed: Sep. 16, 2005

(65) Prior Publication Data

US 2007/0063619 A1 Mar. 22, 2007

(51) Int. Cl.
*H01L 41/08* (2006.01)

(52) U.S. Cl. ...................................... 310/321
(58) Field of Classification Search ............... 310/328, 310/321, 330–333, 348, 351, 352, 367
See application file for complete search history.

(56) References Cited

U.S. PATENT DOCUMENTS

| | | | |
|---|---|---|---|
| 4,321,500 A * | 3/1982 | Paros et al. .................. | 310/321 |
| 4,445,065 A * | 4/1984 | Albert ......................... | 310/321 |
| 4,446,394 A * | 5/1984 | Albert ......................... | 310/321 |
| 4,658,174 A * | 4/1987 | Albert ................... | 310/323.21 |
| 6,411,011 B1 * | 6/2002 | Takeuchi et al. ............ | 310/324 |

* cited by examiner

*Primary Examiner*—Mark Budd
(74) *Attorney, Agent, or Firm*—William B Kempler; W. James Brady; Frederick J. Telecky, Jr.

(57) ABSTRACT

A torsional hinged resonant device having an improved anchor support for providing inertia drive. The area by the anchors connecting the torsional hinges to the support member are thinned to have a reduced cross section. The reduced or thinned area increases flexibility such that less force is required to generate a desired angular rotation.

12 Claims, 4 Drawing Sheets

RESONANT OSCILLATING DEVICE ACTUATOR STRUCTURE

CROSS-REFERENCE TO RELATED APPLICATIONS

This application relates to the following co-pending and commonly assigned patent applications: Ser. No. 11/229,480, filed herewith, entitled Apparatus And Method For Adjusting The Resonant Frequency Of An Oscillating Device and Ser. No. 11/228,894, filed herewith, entitled Magnet On Frame Oscillating Device, which applications are hereby incorporated herein by reference.

TECHNICAL FIELD

The present invention relates generally to the field of torsional hinged MEMS (Micro Electro Mechanical Systems) oscillating devices. More particularly, the invention relates to a power efficient actuator structure for driving and maintaining the torsional hinged device oscillations at the resonant frequency.

BACKGROUND

The use of rotating polygon scanning mirrors in laser printers to provide a beam sweep or scan of the image of a modulated light source across a photoresisted medium, such as a rotating drum, is well known. More recently, there have been efforts to use a much less expensive flat member with a single reflective surface, such as a MEMS resonant oscillating mirror to provide the scanning beam. Other devices using resonant oscillating members, other than mirrors, may also benefit from this invention. These torsional hinged resonant scanning devices provide excellent performance at a very advantageous cost. However, every new technology has its own set of problems and resonant torsional hinged devices such as mirrors are no exception.

As an example, inertially driven torsional hinged resonant devices made of silicon exhibit unusually high mechanical gain. Further, such resonant devices can readily be driven inertially through the support or anchor regions. However, as will be appreciated by those skilled in the art, the power required to drive the device to a required angular position is a function of the stiffness of the torsional hinges at the anchor regions that support the device. Therefore, as customers demand larger mirrors (or other oscillating devices) with higher and higher resonant frequencies, the torsional hinges must be made stiffer and greater actuator or drive power must be provided to accommodate the stiffness of the hinges. Since a favored source of power for an inertial drive is a piezoelectric element, it will be appreciated that as greater drive power is required, greater drive voltages are also required to drive the piezoelectric element. For battery powered applications, such high voltage requirements are a problem.

Therefore, method and structures that facilitate the use of high frequency large resonant devices with a large angular movement without a corresponding increase in drive power would be advantageous.

SUMMARY OF THE INVENTION

These and other problems are generally solved or circumvented and technical advantages are generally achieved by embodiments of the present invention, which provides a torsional hinged anchor or mounting structure such as a mirror that is power efficient. The structure comprises a pair of torsional hinges that support a resonant device such as a mirror that oscillates around a pivot axis. Each hinge of the pair of torsional hinges has a first end connected to the resonant device or mirror, and a second end connected to a support frame or first or second anchor member. The frame or first and second anchor members each have a selected thickness and include a central portion that is connected to a respective torsional hinge and also include at least one mounting portion that is attached to a support structure. A connecting region having a reduced cross-sectional area connects the central portion of the anchor member to the mounting portion. The cross-sectional area of the connecting region may be reduced by etching a trench between the central portion and the mounting area. Alternately, a notch may be cut out of the connecting region. Further, according to a preferred embodiment, the resonant device may be made of silicon.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
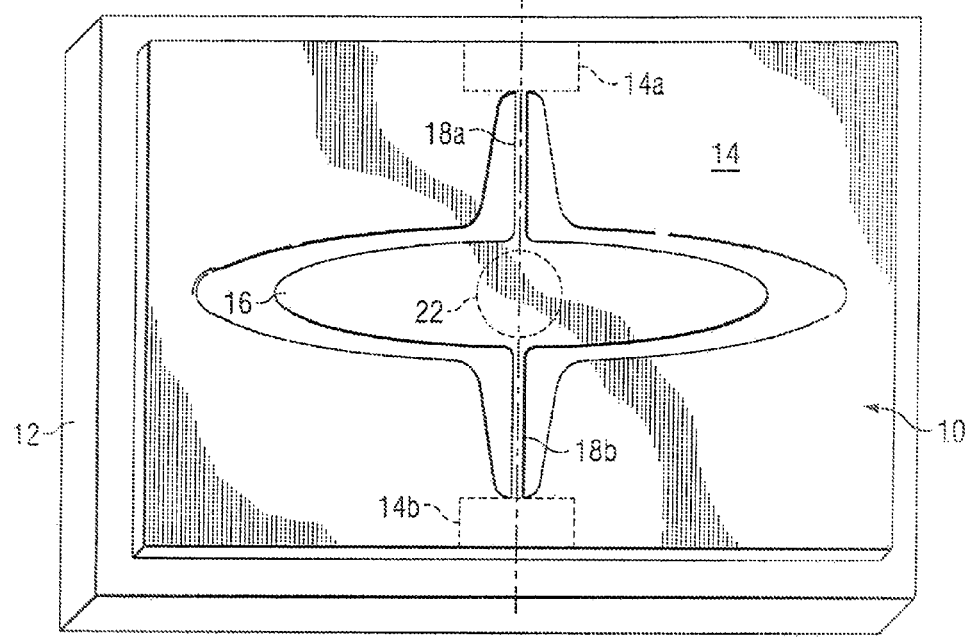
FIGS. 1A and 1B illustrate various types of torsional hinged mirrors that can benefit from the teachings of the present invention.
Figure 1B:
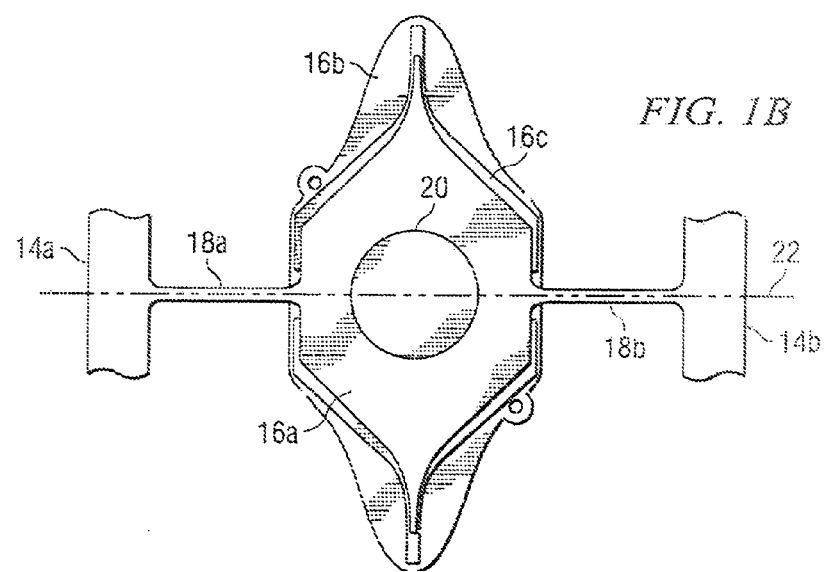

Referring now to FIGS. 1A and 1B the various types of torsional hinged mirrors will be discussed. The selected and illustrated mirrors are examples only and are in no way intended as limitations on the types of torsional hinged mirrors may advantageously benefit from the present invention. FIG. 1A is a single axis single layer mirror device 10 and includes a structure 12 that supports a frame member 14. An operating surface such as reflecting or mirror surface 16 is in turn supported by a single pair of torsional hinges 18a and 18b that lie along pivoting axis 20. There is also shown a single permanent magnet 22 that could be used for monitoring the angular position of the operating surface if such monitoring is necessary. However, it should be understood that other techniques are available for monitoring the angular position of the mirror, and the permanent magnet may be eliminated. As indicated by dashed lines, anchor pads 14a and 14b may be used to support device 10 rather than a support frame 14.

FIG. 1B is a multilayered single axis mirror. Elements of FIG. 1B common to FIG. 1A other are labeled with the same reference numbers.

The multilayered mirror of FIG. 1B is similar to FIG. 1A, except it includes a hinge layer 16, a reflecting surface layer 16b, and a truss layer 16c for strengthening the reflecting surface to prevent deformation at resonant speeds. The hinge layer 16c is unitary with the torsional hinges 18a and 18b and is attached to frame 14 or anchors 14a and 14b. The layers may be formed or etched from a single piece of silicon. There is also shown a permanent magnet 22 that may be included for monitoring purposes. The multilayered mirror is particularly useful if a magnet 22 is used, since the thickness of the magnet and the truss layer can be designed to assure the mass center of the structure lies on the pivoting axis 22.

As will be appreciated by those skilled in the art, silicon is an excellent spring material with very low losses. Consequently, the "Q" of the mirror structure made from silicon is very large (on the order of a thousand or greater), and at resonance, there is a mechanical amplification of approximately "Q" times the motion at the anchor regions. However, as the resonant frequency of a resonant scanning mirror is increased and the size (mass) of the mirror is also increased, stiffer torsional hinges are required. This in turn requires more actuator or drive power. Resonant scanning mirrors that take advantage of the high mechanical gain at resonance may also be effectively inertially driven through the anchor frame 14 or anchor pads 14a and/or 14b. Piezoelectric inertia drive elements or actuators are an excellent inertia drive source. However, as mentioned above and as will be appreciated by those skilled in the art, the more drive power required from a piezoelectric element, the higher the drive voltage the element requires. For many types of application, this is not a major problem. However, for some applications, and especially for battery driven applications, high voltage requirements may be a serious issue.

The present invention addresses the above issue by reducing the stiffness of the anchor connecting regions that connect the central portion where the torsional hinges are attached and the mounting portions of the anchors that support the inertia drive and are attached to a support structure. As mentioned, the inertia drive source may be a piezoelectric element arrangement. The stiffness of the region is modified or reduced to provide more flexibility between the anchor members 14a and 14b or support frame 14 and the torsional hinges 18a and 18b. This allows the up and down motion of the piezoelectric elements to more easily be translated to rotation of the torsional hinges about their axis. More specifically, the stiffness of the anchor on either side of the hinge is decreased to provide easier flexing of the support anchor. This generates the needed angular rotation at the base of the torsional hinges. More importantly this also means that the Piezoelectric or other actuator will not be required to provide as much force to drive the device to a selected rotational angle.

Figure 2:
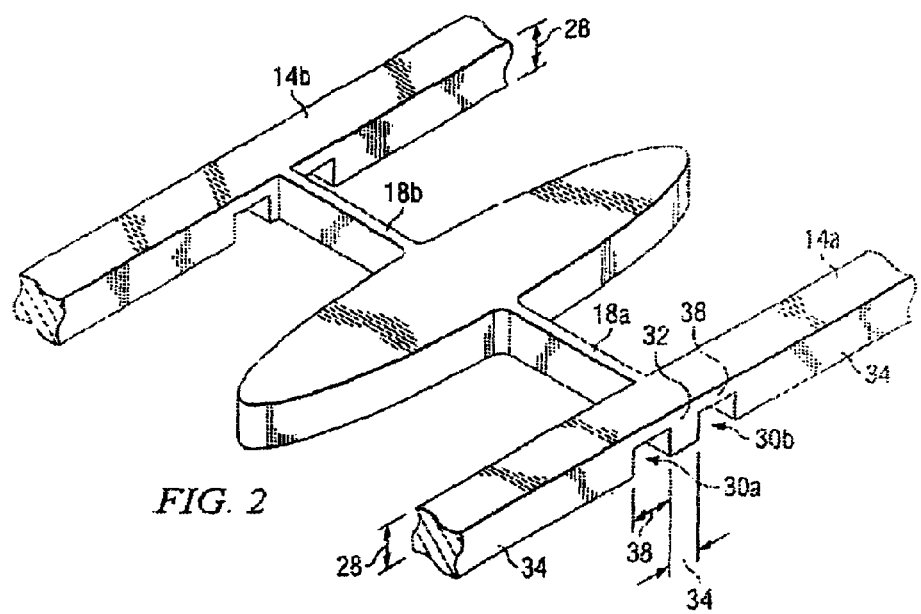
FIG. 2 is a perspective edge view and a side view of a torsional hinged mirror incorporating the teachings of the present invention.
Figure 3A:
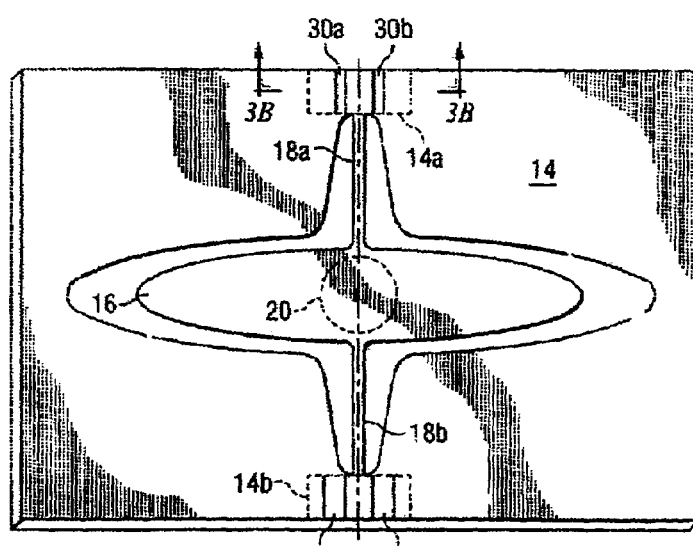
FIGS. 3A, 3B, 4A, and 4B are top views and sectional side views of the mirrors of the type shown in FIGS. 1A and 1B that have incorporated the teachings of the invention.
Figure 3B:
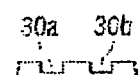
Figure 4A:
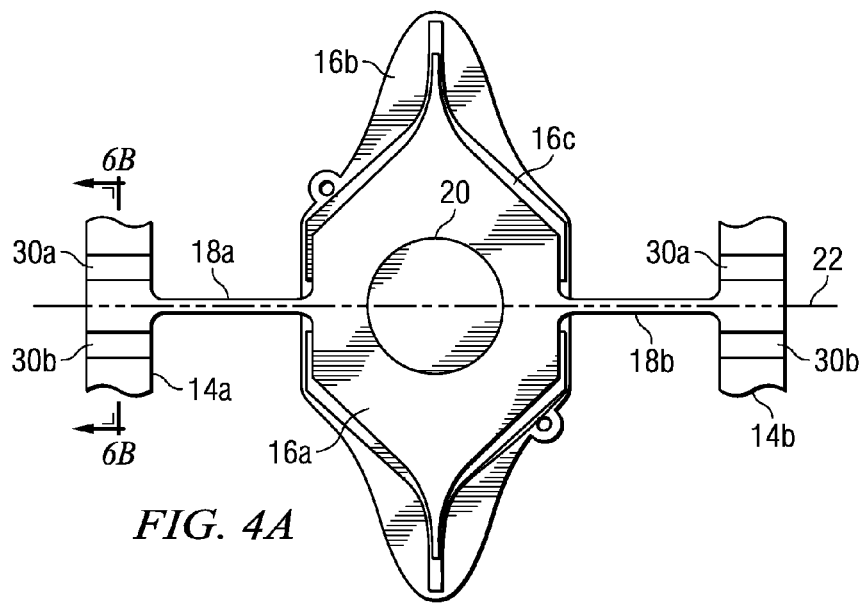
Figure 4B:
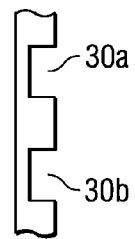

FIG. 2 is a perspective edge view of a single layered mirror similar to the mirror of FIG. 1A and illustrates a notched or thinned frame area as a first embodiment of the present invention. As shown, the anchor portion 14a and 14b as well as the torsional hinges 18a and 18b are etched from silicon having a selected thickness as indicated by arrow 28. The anchor portions are further etched to define a pair of trenches 30a and 30b. Etching the trench results in a central portion 32 of the anchors attached to the torsional hinges 18a and 18b and mounting portions 34 joined or connected to the central portions 32 by the connecting areas 36 having a reduced thickness or cross-sectional area. As an example only, if the thickness of the structure is 120 μm, then in the illustrated embodiment the trenches 30a and 30b are etched to about 70% of the total thickness or approximately 85 μm. Also as shown in the embodiment of FIG. 2, the trenches have a width as indicated by arrow 38. In the example discussed above, the trenches have a width of about 125 μm across so as to leave central portion 32, indicated by arrow 34, that is about 250 μm across. Therefore, a similar size and shaped silicon torsional hinged mirror structure with a notched or reduced area according to the present invention will have an increase in the tip to tip angular deviation over the mirror motion for the same amount of drive power that can be achieved by a prior art solid frame structure.

Referring now to FIGS. 3A, 3B, 4A, and 4B, there are shown a top view and partial edge cross sectional view of the present invention as could be incorporated in the mirror types of FIGS. 1A and 1B.

As discussed above, higher drive voltages are required to drive the piezoelectric elements as the torsional hinges are designed to be thicker and stiffer. The present invention addresses this problem by reducing the connecting regions on the anchor members of the torsional hinged devices. According to the embodiment of FIGS. 2-4, the stiffness was reduced by thinning or reducing the cross-sectional area or thickness of the connecting regions. However, the stiffness of the region may be adjusted by other means.

Figure 5:
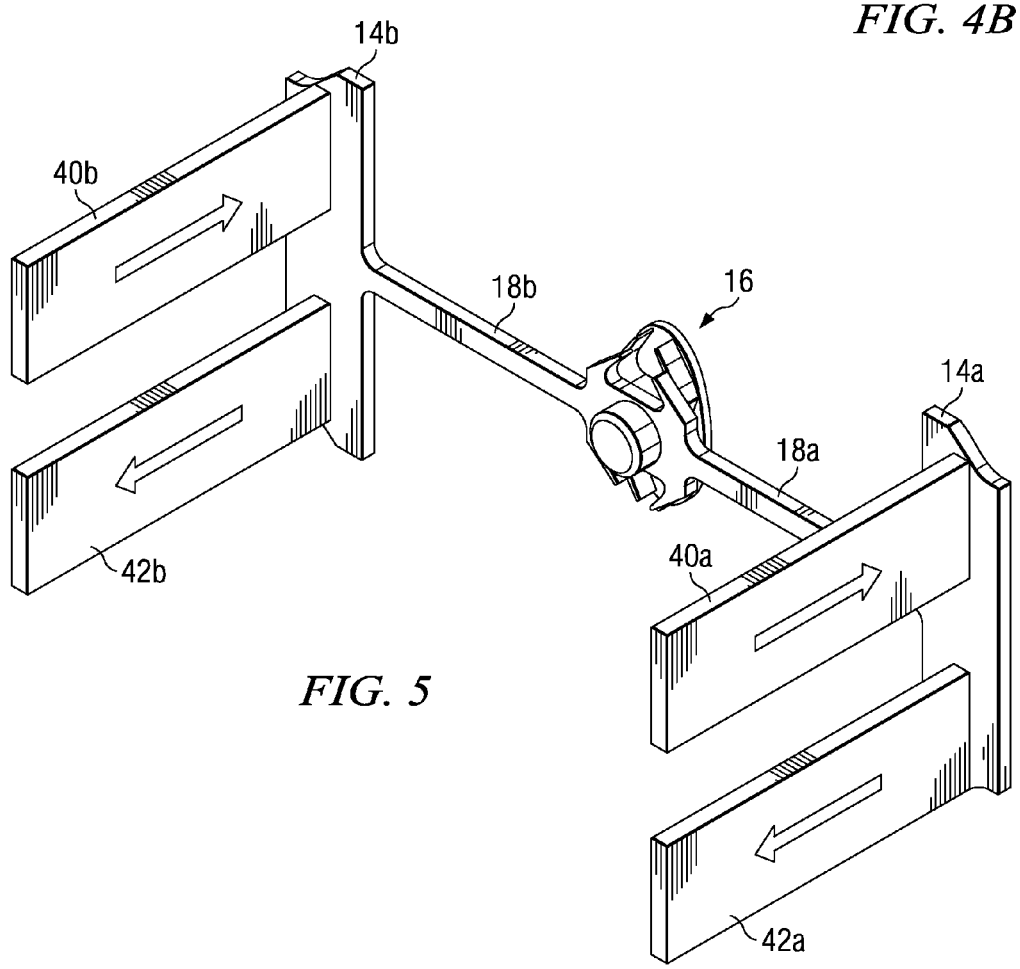
FIG. 5 is a perspective view of a multilayered torsional hinged mirror illustrating a four element piezoelectric drive arrangement that does not incorporate the teachings of the invention.
Figure 6:
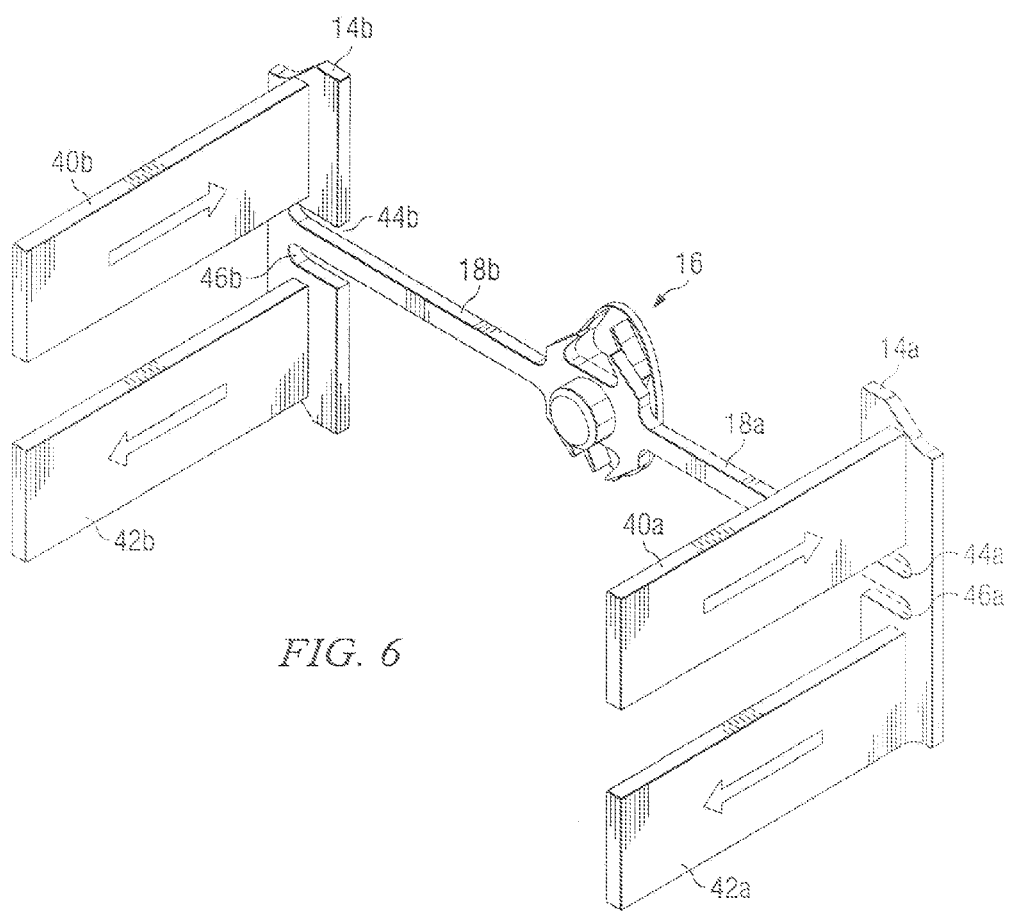
FIG. 6 illustrates the same piezoelectric drive arrangement of FIG. 5 on a mirror and incorporates another embodiment of the invention.

Referring now to FIG. 5, there is shown a perspective view of a presently available torsional hinged mirror that does not incorporate the teachings of the invention. The elements of the mirror of FIG. 5 that are the same as the elements of the mirror of FIGS. 2-4 carry the same reference numbers. Therefore, as shown, torsional hinges 18a and 18b are connected to anchor members 14a and 14b. A first pair of piezoelectric elements 40a and 42a are attached to anchor member 14a on each side of the torsional hinge 18a. Similarly, a second pair of piezoelectric element 40b and 42b are attached to anchor member 14b on each side of the torsional hinge 118b. FIG. 6 illustrates an arrangement of piezoelectric elements and a torsional hinged mirror similar to that of FIG. 5, that incorporates the teachings of the invention. As shown, notches 44a and 46a are cut into anchor member 14a and notches 44b and 46b are cut into anchor member 14b. These notches reduce the stiffness of the connecting region such that less drain power is required to achieve the same tip to tip oscillating movement of the mirror.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, methods and steps described in the specification. As one of ordinary skill in the art will readily appreciate from the disclosure of the present invention, machines, methods, or steps, presently existing or later to be developed, that preform substantially the same function or achieve substantially the same result as the corresponding embodiments described herein may be utilized according to the present invention. Accordingly, the appended claims are intended to include within their scope such machines, means, methods, or steps.

What is claimed is:

1. A resonant device having an improved anchor support comprising:
    a pair of torsional hinges, each hinge of said pair of torsional hinges lying along a pivot axis and having first and second ends;
    a device oscillating at resonance connected between said pair of torsional hinges at said first end of each hinge of said pair;
    first and second anchor members each of said first and second anchor members having a selected thickness and including a central portion attached to mounting portions by connecting regions, said central portions of each of said anchors connected to said second ends of said pair of torsional hinges, and said mounting portions of each anchor mounted to a support structure; and
    said connecting regions having geometry that provides greater flexibility than said central portions wherein said device is a dual hinged mirror made of silicon.

2. The resonant device of claim 1 wherein said device is a single hinge mirror having a single pair of torsional hinges.

3. The resonant device of claim 1 wherein said device is a multilayered device.

4. The resonant device of claim 1 further comprising a piezoelectric element attached to an anchor member.

5. The resonant device of claim 4 said piezoelectric element attached to a mounting portion of an anchor member comprises a first pair of piezoelectric elements attached to said first anchor member.

6. The resonant device of claim 5 further comprising a second pair of piezoelectric elements attached to said second anchor member.

7. The resonant device of claim 1 wherein said connecting region of said first and second anchor members is thinner than said central portion.

8. The resonant device of claim 1 wherein said connecting region of said first and second anchor members defines a notch.

9. The resonant device of claim 5 wherein said connecting region of said first and second anchor members is thinner than said central portion.

10. The resonant device of claim 5 wherein said connecting region of said first and second anchor members defines a notch.

11. A method for improving the efficiency of an inertially driven oscillating device comprising the steps of:
    providing a device oscillating at resonance comprising first and second torsional hinges for supporting an oscillating member, first and second said torsional hinges connected to first and second anchor members respectively, each of said first and second anchor members having a central portion, a connecting region, and a mounting portion; and
    increasing the flexibility of said connecting region with respect to said central portion wherein said step of increasing the flexibility of said connecting region comprises the step of forming notches between said mounting portion and said central portion.

12. The method of claim 11 wherein said step of increasing the flexibility of said connecting region comprises the step of thinning or reducing the thickness of said connecting region.

* * * * *